Patented Nov. 17, 1953

2,659,743

UNITED STATES PATENT OFFICE 2,659,743

11 ALPHA, 17 ALPHA, 21-TRIHYDROXY-PREGNANE-3,20-DIONE

Herbert C. Murray, Hickory Corners, and Durey H. Peterson, Kalamazoo, Mich., assignors to The Upjohn Company, Kalamazoo, Mich., a corporation of Michigan No Drawing. Application July 1, 1952,
Serial No. 296,730

4 Claims. (Cl. 260—397.4)

This invention relates to 11α,17α,21-trihydroxypregnane-3,20-dione and its esters having pharmacological activity and utility in the synthesis of corticosterone, and other 11-oxygenated steroids. An object of this invention is to obtain 11α,17α,21-trihydroxypregnane-3,20-dione and its esters.

This application is a continuation-in-part of our applications Serial No. 180,496, filed August 19, 1950, now abandoned, and Serial No. 272,944, filed February 23, 1952, now Patent 2,602,769, issued July 8, 1952.

The novel 11α,17α,21-trihydroxypregnane compound of the present invention may be represented by the following structural formula:

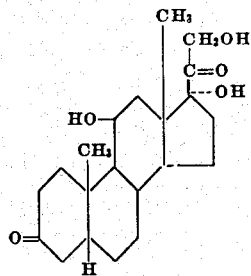

The following examples are illustrative of the processes and products of this invention and are not to be construed as limiting.

*Example 1.—11α,17α,21-trihydroxypregnane-3,20-dione*

A medium was prepared of twenty grams of Cerelose dextrose, forty grams of corn steep liquor, four grams of sodium nitrate, and tap water to one liter, adjusted to a pH of 5.5. Four liters of this medium was sterilized at fifteen pounds of steam pressure in a five gallon Pyrex glass bottle. It was then inoculated with *Rhizopus nigricans* minus strain, ATCC 6227b, and shaken mechanically at room temperature for thirty hours. One gram of 17α,21-dihydroxy-4-pregnene-3,20-dione dissolved in a small quantity of absolute ethanol was then added and the fermentation continued for an additional 112 hours. The pH of the fermentation was then 7.9. The entire beer containing mycelium was extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation.

The methylene chloride extract weighing 1.908 grams was dissolved in 230 milliliters of ethylene dichloride and chromatographed over 150 grams of Florisil synthetic magnesium silicate using 230 milliliter portions of solvents as indicated in the table.

Eluate solids, fractions 20 through 26 were combined, dissolved in 25 milliliters of methylene chloride and decolorized with 0.5 gram of Magnesol magnesium silicate. The filtrate and methylene chloride washing of the Magnesol treatment were evaporated to dryness. The residue was washed with five milliliters of hot ethyl acetate, and then five milliliters of methylene chloride. The undissolved material was dissolved in fifteen milliliters of acetone, filtered, concentrated to dryness, and washed with five milliliters of ether to yield 86 milligrams of crystalline 11α,17α,21-trihydroxypregnane-3,20-dione, confirmed by infrared spectroscopy, melting point 190 to 196 degrees centigrade.

| Fraction | Solvent | Eluate Solids, Milligrams |
|---|---|---|
| 1 | Ethylene dichloride | 16.4 |
| 2 | Ethylene dichloride-acetone 25:1 | 114.9 |
| 3 | do | 187.4 |
| 4 | Ethylene dichloride-acetone 15:1 | 51.7 |
| 5 | do | 17.8 |
| 6 | Ethylene dichloride-acetone 12:1 | 6.7 |
| 7 | do | 12.1 |
| 8 | Ethylene dichloride-acetone 10:1 | 8.2 |
| 9 | do | 4.6 |
| 10 | do | 9.6 |
| 11 | Ethylene dichloride-acetone 8:1 | 9.4 |
| 12 | do | 20.6 |
| 13 | do | 26.7 |
| 14 | do | 31.4 |
| 15 | do | 25.8 |
| 16 | Ethylene dichloride-acetone 5:1 | 25.2 |
| 17 | do | 50.1 |
| 18 | do | 52.2 |
| 19 | do | 50.6 |
| 20 | Ethylene dichloride-acetone 2:1 | 42.2 |
| 21 | do | 155.9 |
| 22 | do | 114.5 |
| 23 | Acetone | 81.1 |
| 24 | do | 185.2 |
| 25 | do | 50.0 |
| 26 | do | 17.0 |
| Total | | 1,367.3 |

The 11α,17α,21-trihydroxypregnane-3,20-dione of this invention is useful in the synthesis of the physiologically active adrenosterone. For example, oxidation with chromium trioxide in acetic acid splits off the side chain and oxidizes the eleven hydroxyl to a ketone to give etiocholane- 3,11,17-trione. The 11α,17α,21-trihydroxypregnane-3,20-dione of this invention demonstrates inhibitory cortisone activity.

Novel esters of 11α,17α,21-trihydroxypregnane-3,20-dione may also be prepared. The starting 11α,17α,21-trihydroxypregnane-3,20-dione is admixed with an acylating agent such as, for example, ketene, a ketene of a selected acid, an acid, acid chloride or acid anhydride, or other known acylating agent, usually in a solvent such as, for example, pyridine or the like, or an inert solvent, including solvents like benzene, toluene, ether, and the like, for example, and heated at a temperature between about zero degrees centigrade and the boiling point of the reaction mixture, usually about room temperature, for a period between about a half hour and about 96 hours. The time of reaction as well as the temperature at which the reaction is carried out, the acylating agent, and the ratio of reactants may be varied. The reaction mixture is suitably poured into ice or cold water, the product collected in an appropriate solvent which is thereafter washed with successive portions of a mildly basic solution and water to obtain a solution which is essentially neutral.

In some instances, the product may crystallize from the reaction mixture, in which case it may be advantageous to separate the product by filtration or other means, wash with water, and thereafter purify by conventional means, such as, for example, by recrystallization from a suitable solvent or by chromatographic purification, as deemed necessary.

The thus-described acylation process, which is illustrated in more detail in the example following in this specification, produces both the mono-esters and the di-esters, although in different proportions, depending upon the proportions of acylating agent to 11α,17α,21-trihydroxypregnane-3,20-dione. Using approximately one equivalent of acylating agent to said steroid produces predominantly the mono-acylated product, whereas with about two or more equivalents of acylating agent to said steroid, the predominant product is the diacylated product.

*Example 2.—11α,21-diacetoxy-17α-hydroxypregnane-3,20-dione*

In a mixture of four milliliters of acetic anhydride and two milliliters of absolute pyridine, forty milligrams of 11α,17α,21-trihydroxypregnane-3,20-dione is dissolved. The reaction mixture is maintained at room temperature for sixteen hours and then poured into sixty milliliters of cold water. The 11α,21-diacetoxy-17α-hydroxypregnane-3,20-dione thus formed is collected in methylene chloride by extracting three times with thirty milliliter portions of methylene chloride. Then the extract is washed with successive ten-milliliter portions, twice with five percent sodium hydroxide and four times with water to obtain an essentially neutral methylene chloride solution of product. The product is isolated from the reaction mixture by distilling the acetic anhydride, acetic acid, and pyridine from the reaction mixture at reduced pressure and crystallizing the distillation residue from the methylene chloride.

In a similar manner, other esters of 11α,17α,21-trihydroxypregnane-3,20-dione are prepared according to the described acylation procedures. Representative esters of 11α,17α,21-trihydroxypregnane-3,20-dione thus-prepared include one to eight carbon atom carboxylic acid acyloxy esters of saturated or unsaturated, aliphatic, carbocyclic, or cycloaliphatic, aryl, arylalkyl, alkaryl, mono, di or polycarboxylic acids which form ester groups such as, for example, formyloxy, acetoxy, propionyloxy, dimethylacetoxy, trimethylacetoxy, butyryloxy, valeryloxy, hexanoyloxy, heptanoyloxy, octanoyloxy, benzoxy, phenylacetoxy, toluoyloxy, cyclopentylformyloxy, β-cyclopentylpropionyloxy, acryloyloxy, cyclohexylformyloxy, the half and di-esters of malonic, maleic, succinic, glutaric and adipic acids, and the like. The acids may also contain non-interfering substituents, such as mono or poly halo, chloro, bromo, hydroxy, methoxy, and the like, if desired.

We claim:

1. 11α,17α,21-trihydroxypregnane-3,20-dione.
2. A compound selected from the group consisting of 11α,17α,21-trihydroxypregnane-3,20-dione and its esters of hydrocarbon carboxylic acids containing less than nine carbon atoms.
3. 11α,17α,21-trihydroxypregnane-3,20 - dione esters of hydrocarbon carboxylic acids containing less than nine carbon atoms.
4. 11α,21 - diacetoxy - 17α - hydroxypregnane-3,20-dione.

HERBERT C. MURRAY.
DUREY H. PETERSON.

No references cited.